(12) United States Patent
Huang et al.

(10) Patent No.: US 12,527,269 B2
(45) Date of Patent: Jan. 20, 2026

(54) METHOD OF USING/APPLYING A KERATIN HYDROLYSIS PEPTIDE SOLUTION TO IMPROVE THE FERTILIZER USAGE EFFICIENCY IN SOYBEAN

(71) Applicant: CH Biotech R&D Co., Ltd., Nantou (TW)

(72) Inventors: Jenn Wen Huang, Taichung (TW); Ching-Chi Tsai, Taichung (TW); Yu-Lun Liu, Taichung (TW)

(73) Assignee: CH Biotech R&D Co., Ltd., Nantou (TW)

( * ) Notice: Subject to any disclaimer, the term of this patent is extended or adjusted under 35 U.S.C. 154(b) by 204 days.

(21) Appl. No.: 18/408,245

(22) Filed: Jan. 9, 2024

(65) Prior Publication Data

US 2025/0127107 A1    Apr. 24, 2025

(30) Foreign Application Priority Data

Oct. 20, 2023 (TW) .................................. 112140296

(51) Int. Cl.
| | |
|---|---|
| *C12P 21/06* | (2006.01) |
| *A01H 3/04* | (2006.01) |
| *C07K 1/12* | (2006.01) |
| *C07K 14/47* | (2006.01) |
| *G01N 33/68* | (2006.01) |

(52) U.S. Cl.
CPC ................ *A01H 3/04* (2013.01); *C07K 1/12* (2013.01); *C07K 14/4741* (2013.01); *G01N 33/6848* (2013.01); *G01N 2333/4742* (2013.01)

(58) Field of Classification Search
CPC ....... C12P 21/06; C07K 1/12; C07K 14/4741; G01N 33/6848; G01N 2333/4742
See application file for complete search history.

(56) References Cited

U.S. PATENT DOCUMENTS 11,932,892 B2 * 3/2024 Ibrahim ................. C07K 14/78

* cited by examiner

*Primary Examiner* — Maryam Monshipouri
(74) *Attorney, Agent, or Firm* — Jen-Teng Lee, Esq.

(57) ABSTRACT

Present invention teaches the method of using a keratin hydrolysis peptide ("KHP") solution to improve the efficacy of fertilizer usage and absorption by soybeans. By selectively choosing specific weights of feathers and water, and treating the mixture to a high-temperature high-pressure hydrolysis process, the resulting solution is confirmed to contain at least 253 peptides and then infused to the fertilized soil in which the soybean seeds are grown, as well as the plants after the seed start sprouting. Optionally, the KHP solution can be diluted by water, as disclosed in the specification, for applying to the soil around the soybean.

5 Claims, 2 Drawing Sheets

METHOD OF USING/APPLYING A KERATIN HYDROLYSIS PEPTIDE SOLUTION TO IMPROVE THE FERTILIZER USAGE EFFICIENCY IN SOYBEAN

PRIORITY CLAIM TO FOREIGN APPLICATION

Applicant hereby makes priority claim to a Taiwan application, number 112140296, having the Taiwan filing date of Oct. 20, 2023.

BACKGROUND OF THE INVENTION

Present invention disclosed and claimed the method and application of a keratin hydrolysis peptide ("KHP") solution for improving the fertilizer utilization and absorption by soybean plants, by using the thermally hydrolyzed feather keratin peptide solution to the soil when the soybean seeds are sowed.

With the application of the KHP solution as disclosed herein, the amount of fertilizer used can be reduced while the root growth and above-ground biomass of soybean seedlings are improved.

The KHP solution is made by a hydrolysis process using feathers and water, with one version of the solution using feathers only, via a high-temperature and high-pressure process, resulting in a solution that has many beneficial applications in the fields of horticulture, agriculture and potentially other farming businesses.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

Soybean is an annual herbal plant; it contains various proteins essential to human health; it can be planted practically everywhere in the world. It is also a good base material for making animal feed as well as other derivative/ additive food supplements. Worldwide, it is estimated that 100 million acres of soybean plants are constantly being planted, tended to and harvested.

Due to its short growing cycle, larger amount of nutrients need to be given to soybean plants at its early growth stage to ensure soybean's proper growth and development. People have been using substantial amount of fertilizers to aid the early development of soybean plants and to help with better ultimate production yield.

Among the three (3) primary nutrients (NPK: Nitrogen, Phosphorus, and Potassium) needed by most plants, Nitrogen plays the key role in the early growth of soybean. However, proper application of Phosphorus and Potassium is also important in the soybean plants' general metabolism.

Recent studies show that chemical-based fertilizers (containing primarily the NPK components stated herein) have become overused in agriculture, leading to soil clumping, deterioration of the microbial environment in the soil and ground water pollution due to the unabsorbed fertilizers by crops.

The concept of Fertilizer Use Efficiency (FUE) is a new benchmark in assessing/evaluating how people should use fertilizers to increase agricultural production and to come up with new ways/regimens of giving nutrients to crops.

One way to achieve the goal is by, as the inventors of this application did, using a KHP solution that can be mixed to a fertilizer, used sparingly, thus improving the fertilizer intake and absorption by the soybean crops with healthier growth and development. By the application of the KHP solution as disclosed herein, the goal of reducing the fertilizer use without reducing the production yield is reached.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of Pogostemon cablin and *Vigna radiata*, as reported in International Journal of Recycling or Organic Waste in Agriculture (8:221-232, 2019).

In 2016, Mr. Chung-Wu Dao, et al, disclosed a method to acidify feather powders as protein additives for organic composting fertilizers, boosting the absorption and utilization of fertilizers on account of organic fermentation. However, such process requires a proper acid-base neutralization adjustment, with potential damages of the acid or base liquids' leakage and ultimate disposal, resulting in additional post-processing costs. The selection of feather powders is, in and of itself, another complicated issues that need to have matching microbial agents for the acidification to work efficiently. There is no sufficient knowledge based on all the pro-and-con spectrum of uses that can provide a good and cost-effective guidance for the peptide hydrolysis method herein.

The inventors of present application, under the aegis of CH Biotech, developed and selected different feather and water compositions and performed the hydrolysis at higher temperature and higher pressure setting, and obtained a different keratin hydrolysis peptide ("KHP") solution that can be used on different crops/plants, including the soybean crops that are grown with normal application of fertilizer, thus boosting the intake/absorption of the fertilizers.

The first embodiment of present invention uses a mixture of water and feathers (water content 50%) at the weight ratio of 3:2 (specific weight of 66 kg of feathers and 44 kg of water) and subject the mixture to a thermal hydrolysis process (80 minutes) to create a solution, resulting in the solution having molecular mass of 593.3-3,508.9 Dalton and containing at least 253 peptides as confirmed by using a mass spectrometer.

The inventors used the spectrometer Dionex UltiMate 3000 UPLC to separate the peptides; an analysis is done via Thermo Orbitrap Fushion Lumos Tribrid Orbitrap mass spectrometry to identify the peptides, which are then subsequently confirmed by looking up the BIOPEP-UWM database.

The solution then is applied to the fertilized soil in which the soybean seeds are planted.

The solution can be diluted by water, at 100 to 500 ratio by volume, and then applied to the soil in which the soybean seeds are planted.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

Table I shows the at least 253 peptides and its annotated sequences for the solution generated in accordance with the disclosure of this application.

DETAILED DESCRIPTION OF THE INVENTION

Figure 1:
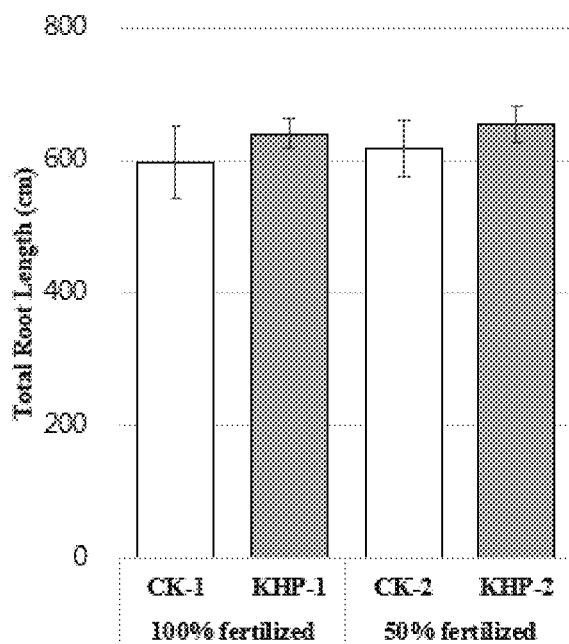
FIG. 1 the comparison of the total root lengths among the four groups: 100% fertilized CK-1, 100% fertilized KHP-1, 50% fertilized CK-2, 50% fertilized KHP-2.

The keratin hydrolysis peptide ("KHP") solution of present invention, as a first specific embodiment, is made by a high-temperature and high-pressure process to treat a mixture of water and feathers where the weight ratio whereby the weight ratio of feathers and water is set at 3:2. In the disclosure below, the specific weight of 66 kg feathers and 44 kg water will be used.

The hydrolysis process takes the steps of:
a. Preparing the KHP solution by mixing 66 kg of feathers whose content is 50% water with 44 kg of water in a sealed container;
b. hydrolyzing the mixture in the container with a temperature and pressure setting of 195° C. and 16 kg/cm$^2$ for a duration of 40 minutes;
c. using a mass spectrometer to confirm the combination of peptides in the solution to contain at least 253 peptides as listed in the specification where their molecular masses are between 500 and 4,000 Daltons, and the concentration is in the range of $2.0\times10^5 \sim 4.5\times10^5$ ppm.

The confirmation of some of the bioactive 253 peptides is further done by referencing the BIOPEP-UWM database.

The solution can then be applied to the soil in which the soybean seeds are planted.

The method of using a keratin hydrolysis peptide (KHP) solution stated above further causes the solution to be diluted with water by volume at the ratio of 1:100-500 for applying to the soil in which the soybean seeds are planted.

The KHP solution can also be applied to the soil for the soybean plants after the seeds start sprouting. The solution can be diluted at the desired ratio of 1:100-500 as noted herein.

The KHP solution can be made by another 2 sets of parameters shown herein:

| Feather Weight (kg) | Water Weight (kg) | Water Content in Feathers % | Presure (kg/cm$^2$) | Temp (° C.) | Time (min) | Product Weight (kg) | Mass (Dalton) | Concentr. (ppm) |
|---|---|---|---|---|---|---|---|---|
| 70 | 0 | 46% | 13 | 180 | 40 | 131.65 | 705.9-3194.7 | 381250 |
| 50 | 40 | 50% | 12 | 185 | 80 | 136.66 | 593.3~3508.9 | 301500 |

To test the effectiveness of the KHP solution made by the steps disclosed herein, the inventors chose the first embodiment (having 66 kg feathers and 44 kg water) solution to conduct the field tests as further described herein. The first embodiment solution will be referred to as the KHP solution.

The field tests consist of four (4) groups of soy bean seeds (choosing the species *Glycine Max*) planted into normal seeding pots where the soil is suitably mixed with a common fertilizer (HauBao-5), with the growth condition of day time temperature 25° C., night time temperature 23° C.; day light hours of 16 and night time hours of 8. The day time light strength is 600 mmole/m$^2$/s. Each group has 9 pots (each pot receiving one soy bean seed) for repeating the same tests and measurements.

The 4 groups are referred to as CK-1, CK-2, KHP-1, and KHP-2. The application of the fertilizer and KHP solution is noted below (100× denotes that the solution is diluted with water by volume at 1:100).

CK-1 group: the soil is infused with 0.05 g fertilizer, given 10 ml water; this is the 50% fertilized group.

CK-2 group: the soil is infused with 0.025 g fertilizer, given 10 ml water; this is the 100% fertilized group.

KHP-1 group: the soil is infused with 0.05 g fertilizer, given 10 ml water with KHP solution of 0.1 ml; this is the 50% fertilized group.

KHP-2 group: the soil is infused with 0.025 g fertilizer, given 10 ml water with KHP solution of 0.1 ml; this is the 100% fertilizer group.

The chart below summarized the fertilizer and the KHP solution usage:

| | fertilization | Fertilizer amount (g/pot) | KHP solution added (ml/pot) | Infused volume (ml/pot) |
|---|---|---|---|---|
| CK-1 | 100% fertilized | 0.05 | 0 | Water 10 ml |
| KHP-1 | | | 0.1 | Water 10 ml (KHP solution diluted 100x) |
| CK-2 | 50% fertilized | 0.025 | 0 | Water 10 ml |
| KHP-2 | | | 0.1 | Water 10 ml (KHP solution diluted 100x) |

On the 13$^{th}$ day after the soybean seeds were planted, the young plants from all the 4 groups are then removed from the pots, cleaned off the dirt/soil from the roots and the above-ground portion for taking different measurements as stated below.

For the root growth's measurements, the dirt/soil was cleaned away, placed in a heating chamber to dry up and then weighed on a digital scale (AP224X, Shimadazu). The average figures (from the 3 repetitive pots) are noted in FIG. 1.

As can be seen, the two KHP groups' root growth is substantially better than the corresponding check groups.

Figure 2:
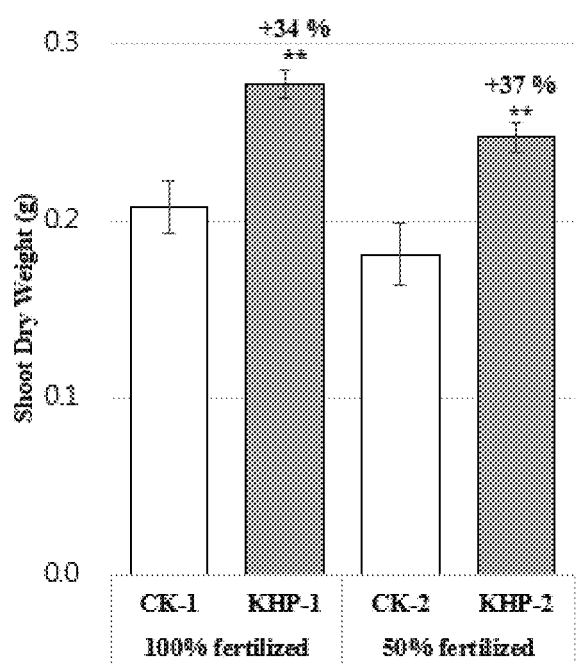
FIG. 2 shows comparison among the four groups of the dry weights for the above-ground portions

For the above-ground biomass comparison, the dry weights are compared. The results are noted in FIG. 2. Similar to the results in FIG. 1, the soybean's growth, as aided by the fertilizer, shows better result when infused with KHP solution.

Figure 3:
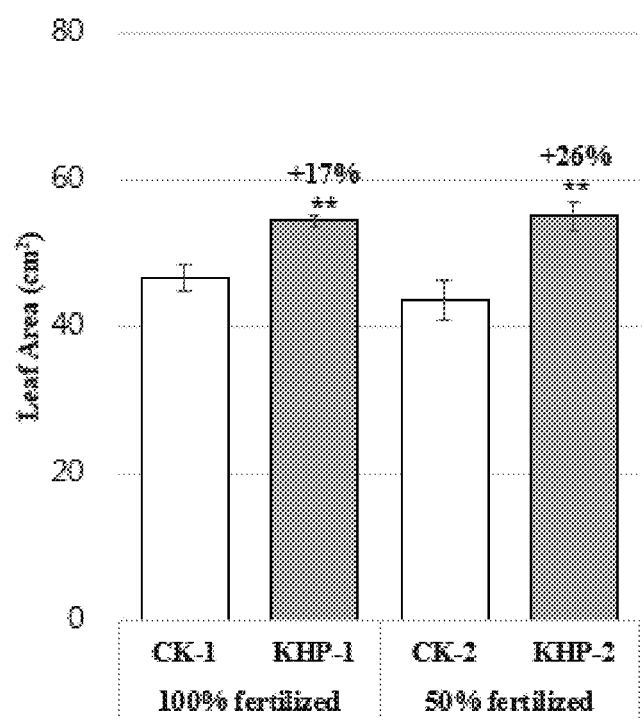
FIG. 3 shows comparison among the four groups of the leaf surface areas.

Lastly, the same number of fully matured leaves are taken from each of the 4 groups; using a leaf analyzer system (WinFOLIA Pro LA 2400, Regent Instruments) to measure the total leaf area. The results are noted in FIG. 3. Similar to the results in FIGS. 1 and 2, the 2 KHP groups show better growth condition than the check groups where the groups are aided by the same amount of fertilizers (both 50% and 100% fertilization settings).

As has been proven by the field tests, and the scientific analysis/measurement done by the inventors, the method of creating the KHP solution and the method of application to soybean crops will help with improving the fertilizer efficacy and, consequently, reducing the fertilizer usage overall.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to increase the fertilizer use efficiency for soybean plants, comprising the steps of:
   a. Preparing the KHP solution by mixing 66 kg of feathers whose content is 50% water and 44 kg of water in a sealed container;
   b. hydrolyzing the mixture in the container with a temperature and pressure setting of 195° C. and 16 kg/cm$^2$ for a duration of 40 minutes;
   c. using a mass spectrometer to confirm the combination of peptides in the solution to contain at least 253 peptides as listed in the specification where their molecular masses are between 500 and 4,000 Daltons, and the concentration is in the range of $2.0 \times 10^5 \sim 4.5 \times 10^5$ ppm; and
   d. applying the solution to the fertilized soil in which the soybean seeds are planted.

2. The method of using a keratin hydrolysis peptide (KHP) solution of claim 1 where the solution is diluted with water by volume at the ratio of 1:100-500 for applying to the fertilized soil in which the soybean seeds are planted.

3. The method of using a keratin hydrolysis peptide (KHP) solution of claim 1 where the solution is diluted with water by volume at the ratio of 1:100 for applying to the soil in which the soybean seeds are planted.

4. The method of using a keratin hydrolysis peptide (KHP) solution of claim 1 where the solution is diluted with water by volume at the ratio of 1:100-500 for applying to the fertilized soil for the soybean plants after the seeds start sprouting.

5. The method of using a keratin hydrolysis peptide (KHP) solution of claim 1 where the solution is diluted with water by volume at the ratio of 1:100 for applying to the soil for the soybean plants after the seed start sprouting.

* * * * *